(12) United States Patent
Weingaertner et al.

(10) Patent No.: US 7,951,496 B2
(45) Date of Patent: May 31, 2011

(54) MODEL BASED REAL-TIME OPTIMIZATION OF FUEL CELL CLUSTERS

(75) Inventors: David Weingaertner, Sunnyvale, CA (US); Swaminathan Venkataraman, Cupertino, CA (US)

(73) Assignee: Bloom Energy Corporation, Sunnyvale, CA (US)

( * ) Notice: Subject to any disclaimer, the term of this patent is extended or adjusted under 35 U.S.C. 154(b) by 717 days.

(21) Appl. No.: 12/000,924

(22) Filed: Dec. 18, 2007

(65) Prior Publication Data

US 2008/0166604 A1    Jul. 10, 2008

Related U.S. Application Data

(60) Provisional application No. 60/875,825, filed on Dec. 20, 2006.

(51) Int. Cl.
*H01M 8/04* (2006.01)
*H01M 8/24* (2006.01)

(52) U.S. Cl. .......................... 429/428; 429/471
(58) Field of Classification Search .................. 429/428, 429/471
See application file for complete search history.

(56) References Cited

U.S. PATENT DOCUMENTS

| | | | |
|---|---|---|---|
| 6,376,111 B1 | 4/2002 | Mathias et al. | |
| 6,383,670 B1 | 5/2002 | Edlund et al. | |
| 6,762,587 B1 | 7/2004 | Barbetta | |
| 6,833,709 B2 * | 12/2004 | Xie | 429/471 X |
| 6,924,053 B2 | 8/2005 | McElroy | |
| 2002/0192516 A1 | 12/2002 | Tajima | |
| 2004/0081867 A1 | 4/2004 | Edlund | |
| 2004/0202914 A1 | 10/2004 | Sridhar et al. | |
| 2004/0217732 A1 | 11/2004 | Zhu et al. | |
| 2005/0048336 A1 | 3/2005 | Takebe et al. | |

(Continued)

FOREIGN PATENT DOCUMENTS

| | | |
|---|---|---|
| EP | 1 501 146 A2 | 1/2005 |
| KR | 10-2003-0013661 A | 2/2003 |
| KR | 10-2005-0021868 A | 3/2005 |

(Continued)

OTHER PUBLICATIONS

U.S. Appl. No. 11/656,006, filed Jan. 22, 2007, Sridhar.

(Continued)

*Primary Examiner* — Stephen J. Kalafut
(74) *Attorney, Agent, or Firm* — The Marbury Law Group, PLLC

(57) ABSTRACT

A power generation system is provided. The power generation system includes a fuel cell controller, at least one fuel cell cluster operably connected to the fuel cell controller and a data server operably connected to the fuel cell cluster. The data server is configured to obtain operational data from the fuel cell cluster. In addition, a model server operably connected to the data server. The model server is configured to model the operational characteristics of the fuel cell cluster during the actual operation of the fuel cell cluster and modify the operation of the fuel cell cluster in real-time, based on the operational data obtained by the data server.

26 Claims, 4 Drawing Sheets

U.S. PATENT DOCUMENTS

| | | | |
|---|---|---|---|
| 2005/0048337 A1 | 3/2005 | Matsubayashi et al. | |
| 2005/0112426 A1 | 5/2005 | Toth et al. | |
| 2005/0164051 A1 | 7/2005 | Venkataraman et al. | |
| 2005/0278076 A1* | 12/2005 | Barbir et al. | 429/22 X |
| 2007/0196704 A1 | 8/2007 | Valensa | |
| 2007/0243435 A1 | 10/2007 | Dutta | |
| 2007/0259230 A1* | 11/2007 | Berntsen et al. | 429/23 |

FOREIGN PATENT DOCUMENTS

| WO | WO 2004/092756 A1 | 10/2004 |
|---|---|---|

OTHER PUBLICATIONS

Anonymous, Presentation of the LabView-based software used in the Fuel Cell Technologies Testing System. Internet Article, Jul. 15, 2004, http://web.archive.org/web/20040715025135/fuelcelltechnologies.com/Support/Downloads/Tutorial.pdf.

Hamburger, R. O., et al., "LabView DSC Automates Fuel Cell Catalyst Research", Nov. 4, 2004, http://web.archive.org/web/20041104200039/http://bloomy.com/newsletters/fuelcellresearch.pdf.

* cited by examiner

MODEL BASED REAL-TIME OPTIMIZATION OF FUEL CELL CLUSTERS

CROSS-REFERENCE TO RELATED PATENT APPLICATIONS

The present application claims benefit of U.S. provisional application 60/875,825, filed Dec. 20, 2006, which is incorporated herein by reference in its entirety.

BACKGROUND

The present invention relates generally to the field of power generation optimization and management. Specifically, the present invention is directed to a control system for operating a cluster of fuel cell systems.

The following description of the background of the invention is provided simply as an aid in understanding the invention and is not admitted to describe or constitute prior art to the invention.

Industrial power generation systems may be provided to a customer in a modular cluster of fuel cell systems. At any given time, the operating characteristics of a single fuel cell module can be different from the operating characteristics of other fuel cell modules in the fuel cell cluster. Given the large amount of data generated by an operating cluster of fuel cell systems, and the complex interactions between independent variables, human operators cannot be expected to adjust control system set points to maintain a technical or economic optimum set of set points for the entire cluster.

Accordingly, there is a need to obtain real-time operational data from fuel cell clusters and use that data to optimize the economic and operational characteristics of a fuel cell cluster and power generation system.

SUMMARY

According to one embodiment of the invention, a power generation system includes a fuel cell controller, at least one fuel cell cluster operably connected to the fuel cell controller, a data server operably connected to the fuel cell cluster, wherein the data server is configured to obtain operational data from the fuel cell cluster, and a model server operably connected to the data server, configured to model the operational characteristics of the fuel cell cluster during the actual operation of the fuel cell cluster and modify the operation of the fuel cell cluster in real-time, based on the operational data obtained by the data server.

According to another embodiment of the invention, a method for optimizing the operation of a power generation system having at least one fuel cell cluster, includes the steps of obtaining operational data concerning the fuel cell cluster during operation of the fuel cell cluster, modeling the operation of the fuel cell cluster in real-time using the operational data, determining whether the operation of the fuel cell cluster can be improved by calculating the optimum operational set points for the fuel cell cluster based on the obtained operational data and modifying the operation of the fuel cell cluster by setting the fuel cell cluster to operate at the optimum operational set points.

According to another embodiment of the invention, a power generation system comprises a plurality of fuel cell clusters. Each cluster comprises at least one fuel cell module, each fuel cell module comprising a plurality of fuel cell stacks, a fuel processing module adapted in operation to deliver fuel to the fuel cell module, an electronics module adapted in operation to receive power from the fuel cell modules and modify the received power into a usable form, a fuel cell economic controller, and a fuel cell supervisory controller. The system also comprises at least one server operably connected to the fuel cell economic controller of each cluster. The at least one server is adapted to determine an optimum economic and operational efficiency of the power generation system and to modify operation of the plurality of fuel cell clusters to achieve the optimum economic and operational efficiency of the power generation system.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

DETAILED DESCRIPTION

Embodiments of the present invention will be described below with reference to the accompanying drawings. It should be understood that the following description is intended to describe exemplary embodiments of the invention, and not to limit the invention.

Figure 1:
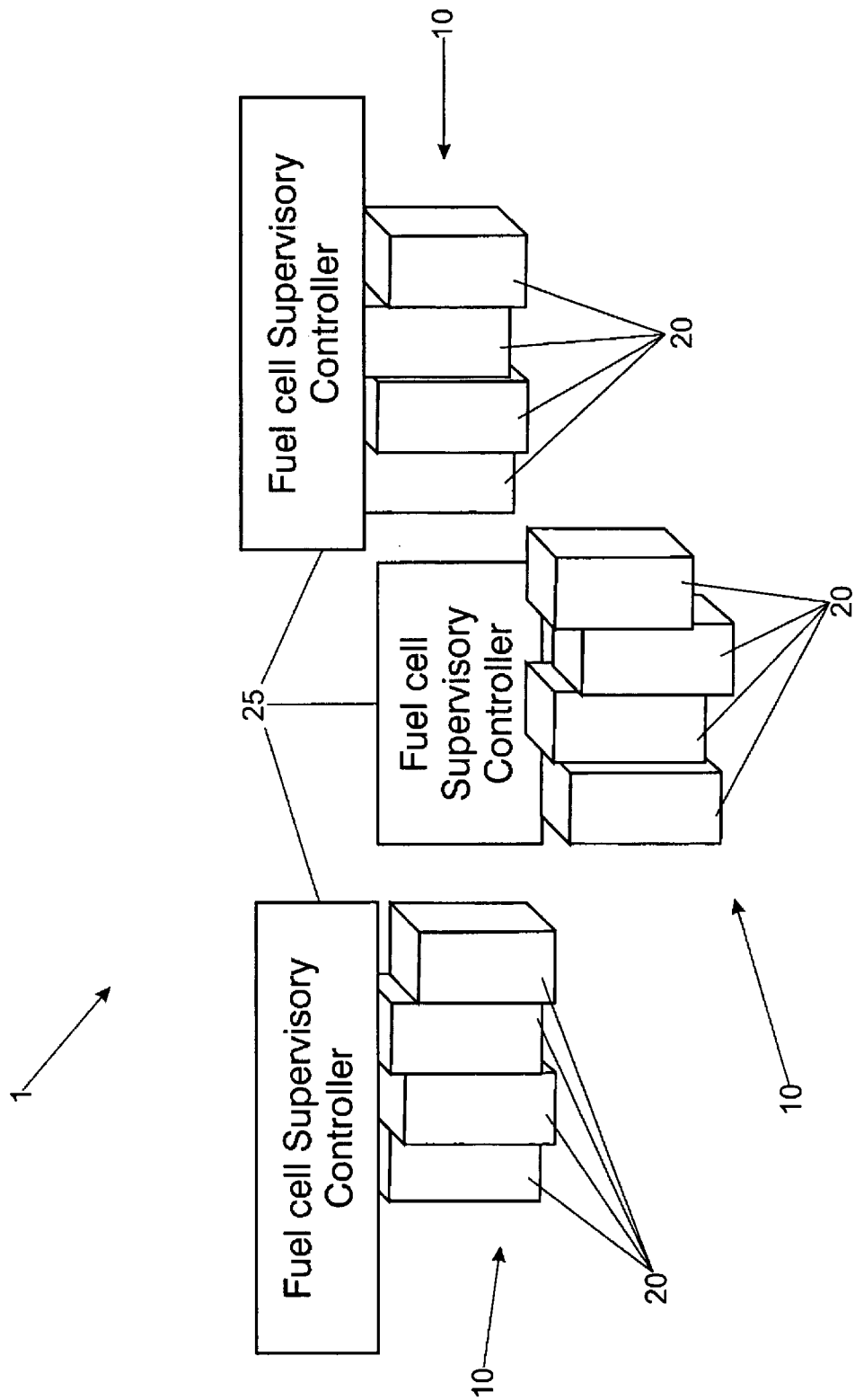
FIG. 1 is a block diagram of a modular power generation system.

FIG. 1 is a block diagram of a modular power generation system 1. The power generation system 1 is comprised of at least one fuel cell cluster 10, which is made up of at least one fuel cell module 20. For example, three clusters 10 are shown. Each cluster 10 may contain any suitable number of modules, such as one or more modules 20, for example one to twenty modules, preferably four to eight fuel cell modules. Each cluster 10 may also contain optional power conditioning/electronics (i.e., inverters and other electronics) and fuel processing (i.e., fuel treatment, fuel compressors, desulferizers, etc.) modules. Each module 20 contains a plurality of fuel cells, such as two to twenty fuel cell stacks, for example 4-8 stacks and associated balance of plant components. A non-limiting example of a module 20 is described in U.S. patent application Ser. No. 11/002,681, filed Dec. 3, 2004, and U.S. Provisional Patent Application No. 60/760,933, filed Jan. 23, 2006, both herein incorporated by reference.

A fuel cell supervisory controller 25 is also provided for each cluster 10. The supervisory controller 25 keeps the fuel cell cluster running safely by adjusting various operating parameters, such as the voltage to a blower VFD to maintain a constant air flow rate. The primary objective of the fuel cell supervisory controller 25 is to keep each individual fuel cell module 20 stable during the module's operation. In order to maintain stable operation of each individual fuel cell module 20, the fuel cell supervisory controller 25 controls the operation of each fuel cell module 20 in reference to a number of operational set points. The fuel cell supervisory controller 25 ensures that each fuel cell module 20 operates within an acceptable range of these operational set points, thus maintaining stable operation of each fuel cell module 20. For example, an operator sets some of the set points for the supervisory control—e.g. the reformer steam to carbon ratio, or the desired amount of power to be produced. Supervisory control happens on a very fast time scale—adjustments may occur every 100 milliseconds to every couple of seconds.

The fuel cell supervisory controller 25 is capable of controlling each individual fuel cell module 20. At any given point in time, the operating characteristics of a single fuel cell module 20 is different from that of the other fuel cell modules 20 in a cluster. The stack operating characteristics may include temperatures, pressures, pressure drops, differential pressures, fuel flow rate, power generation (i.e., current or voltage generation by module), fuel utilization, air utilization, etc. The balance of plant (BOP) operating characteristics may include pressures, pressure drops, differential pressures, power consumption (by component or cumulative), heat exchanger temperatures, heat exchanger temperature changes, heat exchanger effectiveness, reformer temperatures, water flow rate, water inventory, steam:carbon ratio, anode recycle flow rate, air flow rates (main flow rate to the fuel cells or flow rate to a fuel exhaust burner or oxidizer), etc.

However, stable operation of each fuel cell module 20 does not necessarily ensure that the power generation system 1 as a whole is operating in the most economically efficient manner.

Figure 2:
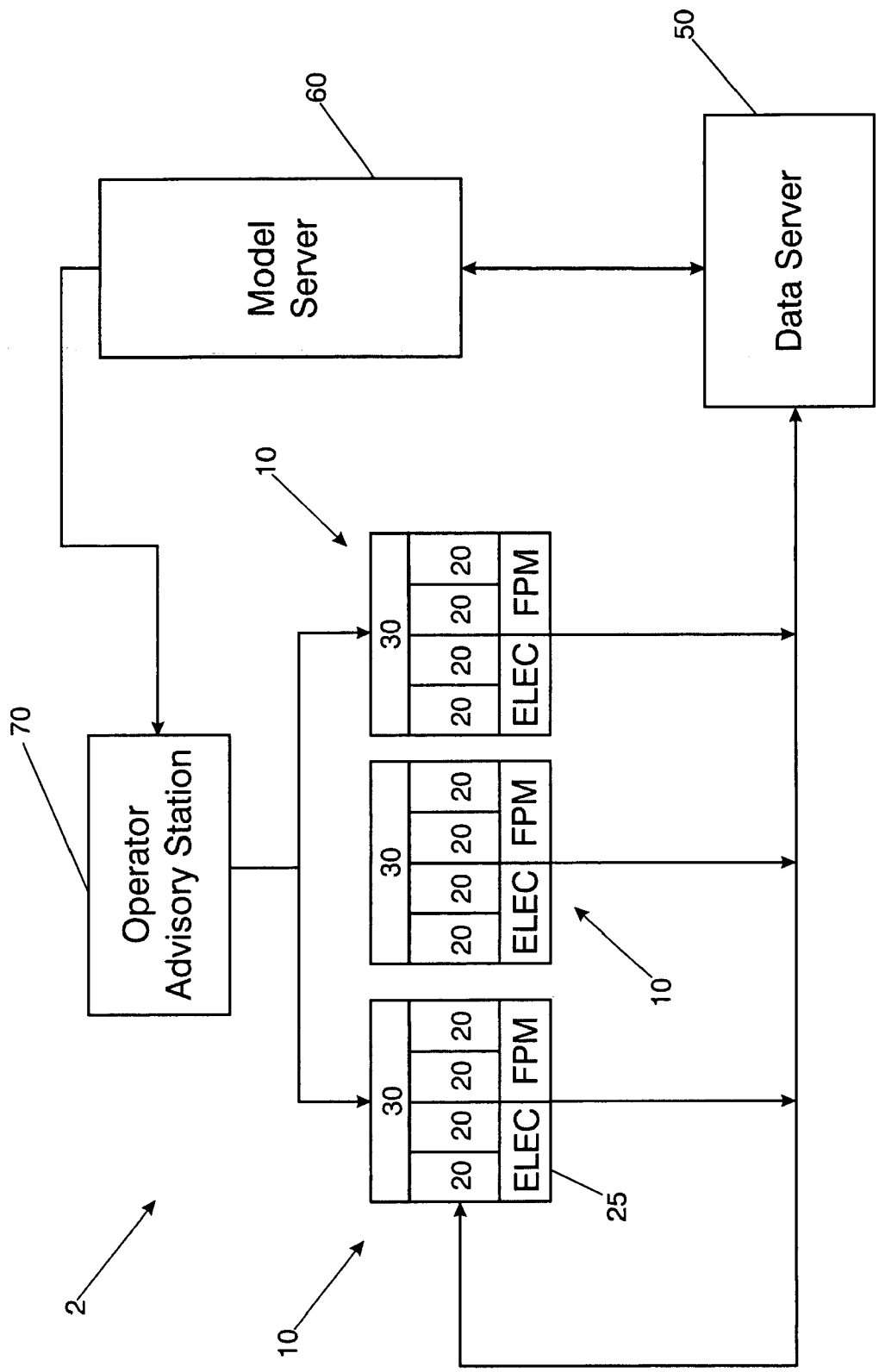
FIG. 2 is a block diagram of a power generation system according to one embodiment of the invention.
Figure 3:
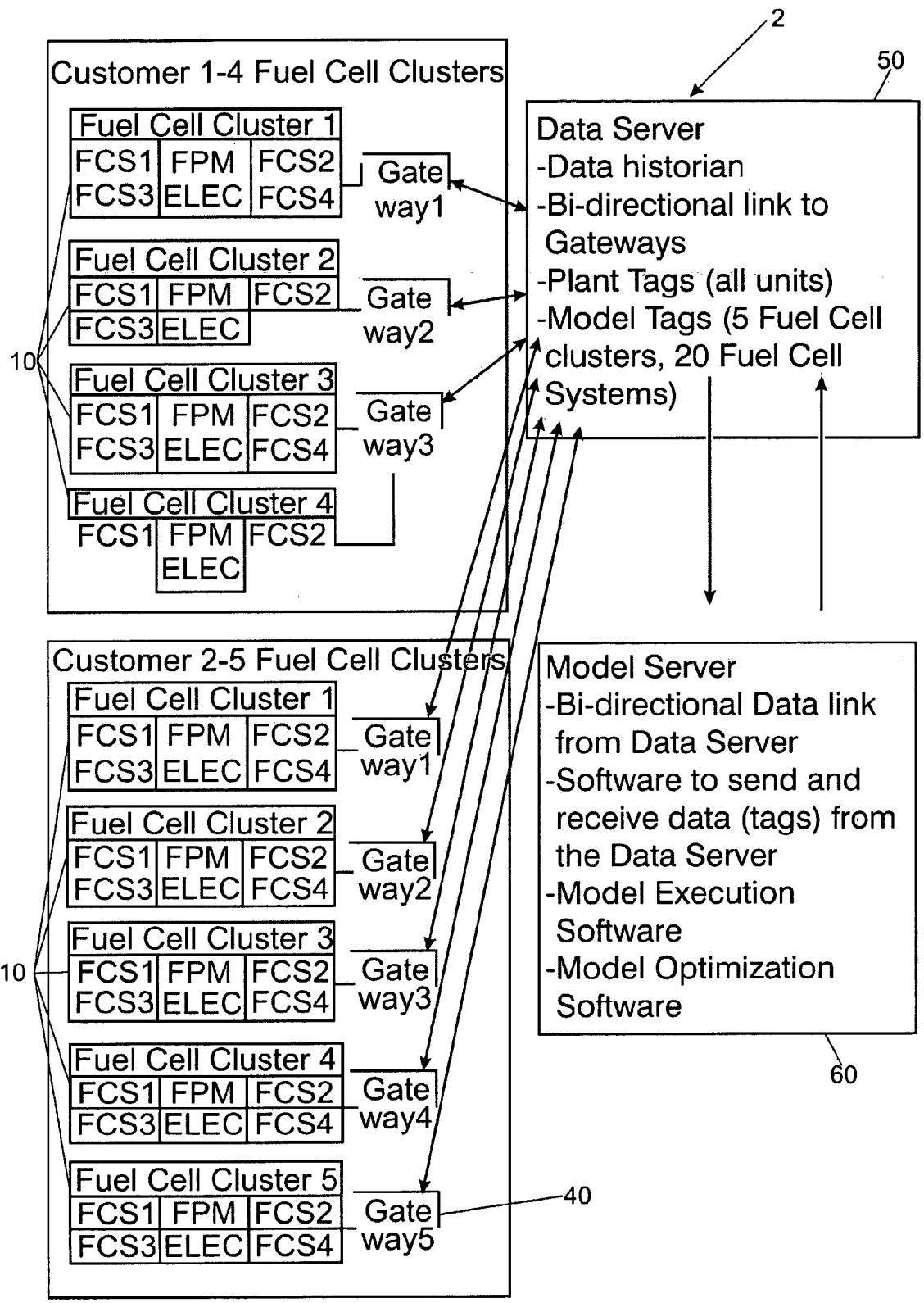
FIG. 3 is a block diagram of a power generation system according to one embodiment of the invention.

FIGS. 2 and 3 show a power generation system 2 according to one embodiment of the invention. The power generation system 2 includes at least one fuel cell cluster 10, such as two to ten clusters, for example, three clusters are shown in FIG. 2. Each fuel cell cluster 10 is made of one or more fuel cell modules/systems (FCS) 20. In particular, a fuel cell cluster 10 is a cluster of fuel cell modules 20 that share a common fuel processing module (FPM) and electronics module (ELEC). The electronics module includes the supervisory controller 25 shown in FIG. 1. Thus, a single fuel cell cluster 10 can be operated independently of other fuel cell clusters 10. The FPM distributes (and if required, treats) fuel from the central feed to a fuel cell cluster 10 to the individual fuel cell modules 20. The ELEC receives the power from one or more fuel cell modules 20, and modifies/conditions the power into a usable form (e.g. modifies the output voltage, transforms DC to AC, etc.).

One or more fuel cell economic controllers 30 may be provided. For example, the system 2 may have a single controller 30. Alternatively, each cluster 10 or each fuel cell module 20 may have a separate economic controller 30, such as a control circuit chip or microcomputer. While the economic controller 30 may comprise the same device as the supervisory controller 25, preferably the controllers 25 and 30 comprise separate devices. The fuel cell economic controller 30 is capable of controlling each individual fuel cell module 20. Each fuel cell cluster 10 is operably connected via a bidirectional link to a data server 50. It should be understood that the bidirectional link and any operable connection mention herein may be implemented by any physical wire, cable or fiber optic method as well as wirelessly. As shown in more detail in FIG. 3, the connection between each fuel cell module 20 and the data server 50 is provided via a gateway 40. Preferably, the gateway 40 is a computer that receives and sends information related to a fuel cell cluster 10 to the data server 50. The gateway may also perform supervisory control. Typically the gateway 40 is located in close physically proximity to the fuel cell cluster (or clusters) 10 that it serves. The data server 50 is operably connected via a bidirectional link to a model server 60. In addition, as shown in FIG. 2, the model server 60 may be operably connected to an operator advisory station 70, such as a display or control panel, which is operably connected to the fuel cell economic controllers 30. The economic control of the embodiments of FIGS. 2 and 3 does not mimic or replace the supervisory control because some of the set points are arbitrary and they are determined to meet an economic optimum. The economic control can occur on a much slower time scale than supervisory control, for example with economic adjustments occurring less frequently than once every ten minutes, for example once or twice an hour.

FIG. 3 depicts the power generation system 2 being implemented for two customers. It should be understood that FIG. 3 is provided for exemplary purposes only. The power generation system 2 can consist of multiple customers that may have one or more sites. These customer sites may also have multiple fuel cell clusters 10. As shown, customer 1 has four fuel cell clusters 10. Customer 2 has five fuel cell clusters 10. Each fuel cell cluster 10 may have any number of fuel cell modules 20, such as four, fuel processors and electronics modules. A gateway 40 is configured to interface with one or more fuel cell clusters 10. As shown, a data server 50 is operably connected via a bidirectional link to each gateway 40. Data regarding the operation of each fuel cell cluster 10 is passed to the gateway 40. The gateway 40 then passes the data to the data server 50.

The data server 50 collects data from each fuel cell cluster 10 during operation. Typically, the data is operational information about the fuel cell cluster 10 and each fuel cell module 20. The data server 50 receives and stores stack and/or BOP operating data, such as operating temperature, fuel flow rate and utilization, output power, setting, as well as the other operating data listed above from multiple fuel cell clusters 10 (possibly from multiple sites and/or multiple customers). The data server 50 can also send data back to the gateway 40, typically the data is in the form of desired operational set points for the fuel cell clusters 10. Either the individual gateway or the data server can also calculate derived properties, e.g. fuel cell efficiency from fuel consumption and power generation. Among other information, the data describes how efficiently the fuel cell cluster 10 is operating. The data server 50 may also perform a data reconciliation function based on the data received. Operating data from process equipment can be imprecise, inconsistent and/or inaccurate due to instrumentation limitations. Data reconciliation uses relative instrument reliabilities and models that incorporate physical characteristics of the process to adjust the measured values from the instruments to a consistent set of likely, "true" values.

The data server 50 can also send data to and receive data or "tags" from the model server 60. According to one embodiment of the invention, the data server 50 is configured to store the operational data of numerous fuel cell clusters 10. However, to expedite the modeling and optimization advantages of the model server 60, the data server 50 is configured to selectively provide the model server 60 data pertaining to the specific customer, and or fuel cell cluster 10 of interest. According to another embodiment of the invention, due to bandwidth and/or computer limitations, multiple data servers 50 may be used in conjunction with multiple model servers 60.

The model server 60 is configured to model the operation of the power generation system 2. In addition, based on the data acquired by the data server 50, the model server 60 is configured to perform online optimization of the power generation system 2, i.e., optimize the operation of the power generation system 2 being modeled. The model server 60 is configured to run in real-time concurrent to the operation of the power generation system 2. It should be noted that the terms "real-time" and "real-time optimization" means that the model uses very recent data but does not mean that the model has to use data from the exact same moment. Thus, the term "real-time" includes within its scope and can be referred to as "near real-time". As shown in FIG. 3, the model server 60 can be configured to optimize the operation of each customer site independently or simultaneously. According to another embodiment of the invention, each customer site could have its own model server 60.

Figure 4:
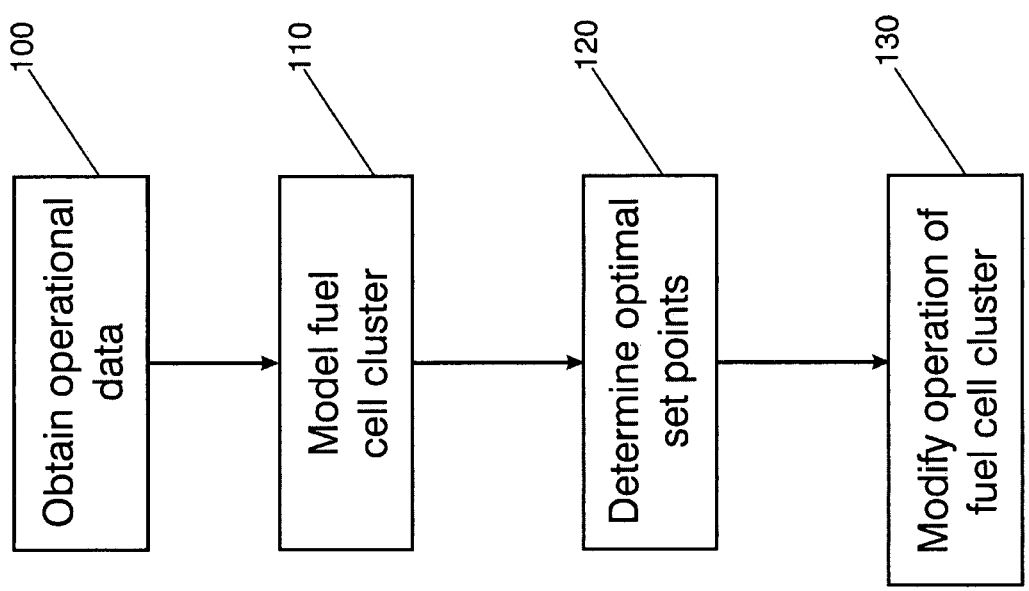
FIG. 4 is a flow chart describing the operation of a power generation system according to one embodiment of the invention.

FIG. 4 is a flow chart that outlines the optimization process. First, operational data of the fuel cell clusters 10 is obtained (Step 100) by the data server 50. This information is transmitted to the model server 60. Operation of the fuel cell clusters 10 is then modeled (Step 110). The model server 60 then determines set points for each fuel cell module 20 that will allow the power generation system 2 to obtain optimal economic and operational efficiency such as an optimal fuel utilization rate, and/or the lowest operating cost (Step 120). The suggested set points are transmitted back to the data server 50. Accordingly, the data server 50 modifies the operation of the fuel cell clusters 10 to approach the suggested operational set points (Step 130).

According to one embodiment of the invention, the model server 60 is configured to execute at a regular interval (e.g., once every hour). The model server 60 is a high fidelity model of the entire power generation system 2. The model server 60 is automated such that portions of the model that are not applicable to a specific customer may be deactivated. For example, as shown in FIG. 3, portions of the model associated with fuel cell cluster 10 (two, four and five for customer two) would be deactivated for customer one. The model server 60 acquires the operational data of the fuel cell clusters 10 via the data server 50 and is configured to simulate conditions indicated by the operational data. The model server 60 is further configured to re-calibrate itself to simulate optimum operational efficiency of the power generation system 2 by determining the economic and operational optimum set points of the power generation system 2. An operational optimum can be related to maximizing efficiency while economic optimums may include configuring the power generation system 2 to lower operating cost or maximize profit. Operational optimums are also directed toward desired future operational performance. For example, it may be desired to maximize the profit of the system 2 while taking into account expected stack degradation and replacement and maintenance costs.

The optimization operation can be continuous, such as regulating the fuel flow rate and/or temperature of a fuel cell module 20, or discrete, such as specifying which type of fuel should be used (i.e., natural gas or propane, etc.) or whether a specific fuel cell stack or module should be operational at all. The model server 60 passes the re-calibration data back to the data server 50. According to one embodiment of the invention, the model server 60 transmits data to the data server 50 via an OPC server, a CIM-IO for OPC server and Aspen OnLine to Aspen Plus with EO Optimizer to reconcile, estimate and optimize the power generation system 2. In turn, the data server 50 sends commands to individual fuel cell modules 20 in order to re-calibrate the power generation system 2 so that it operates at optimum levels based on the set points calculated by the model server 60. According to another embodiment of the invention, the model server 60 is configured to send re-calibration data as recommendations to an operator advisory station 70 instead of the data server 50. The operator advisor station 70 allows a human operator to review the model server's 60 set point recommendations before they are carried out. In turn, the operator can accept or reject or modify the model server's recommendations. In addition, the operator advisory station is configured to allow the operator to automatically or manually send set point data to the fuel cell controller 30.

The operational capabilities of the model server 60 will now be described in further detail. The model server 60 is configured to carryout several functions during a single run cycle to obtain economically and operationally desirable set points. For example, the model server 60 is capable of time averaging received data values to damp instantaneous spikes. According to another embodiment of the invention, the model server 60 is capable of performing data conditioning which is the rejection and replacement of bad and/or nonsensical data with nominal values for that operational data. The model server 60 is also capable of performing data reconciliation where the model server 60 is executed to reconcile contradictory measurement data based on the expected reliability of individual measurement data.

According to another embodiment of the invention, the model server 60 is configured to perform parameter estimation. Parameter estimation uses operating data from process equipment to determine one or more characteristic parameters to characterize operation in a model. Typically, the estimated parameter is not a fundamental measurement. For example, the fouling factor for a heat exchanger could be estimated from inlet and outlet flows and temperatures from a heat exchanger and the design value of the heat transfer coefficient. Parameter estimation may be included in a data reconciliation step, or in a separate step. That is, the model server 60 can determine key operational parameters for the power generation system 2 that describe the system's current operation. For example, the model server 60 can determine how much each fuel cell cluster 10 has degraded from balance of plant (BOP) performance data.

With regard to economic considerations, the model server 60 can obtain the price, in real-time, of all utilities (i.e., power, natural gas) being used by the power generation system 2. According to another embodiment of the invention, the model server can use the data obtained from the data server 50 in conjunction with other environmental data to perform demand forecasting. Demand forecasting estimates the power demand for an upcoming operating period. For example, an estimate of the power required for air conditioning could be estimated from a forecast for the temperature and relative humidity. Moreover, the model server 60 is configured to use reconciled measurements, estimated parameters and real-time prices to determine optimum set points for each fuel cell module 20 within the power generation system 2. For example, each fuel cell module 20 in a fuel cell cluster 10 can be set to produce a different amount of power and/or to utilize a different amount of fuel and/or operate at a different temperature from one or more other modules. In the alternative, the model server 60 can instruct the data server 40 to not vary the power output of a particular fuel cell module 20 by more than 5% or that the stack temperature must be kept below a certain temperature. The model server 60 can also specify that the stack degradation rate must be kept below a specified ratio (e.g., 3%/10000 hours) or that a specific fuel cell module 20 not be operated at all for various reasons including repairs.

Alternatively, the model server 60 can be configured to take into account customer specific features. For example, if the customer is a data center, power use is expected to be divided between clean power for running the servers, and normal power for running the air conditioning. Model server 60 calculations to determine the optimum power generation level, as well as the control system set points to generate that power could take into account one or more of the (1) real-time utility pricing information (natural gas or electricity) (2) the customer specific utility contract information (e.g. what is the likelihood of setting a new peak for power consumption from the grid) and (3) the customer specific demand information (e.g. estimating the air conditioning load from the outside temperature, relative humidity and server load, or estimating the server load based on the time of day).

According to the numerous disclosed embodiments of the invention above, the invention has several advantages. For example, currently there is no solution for conducting real-time, on-line data conditioning, data reconciliation, parameter estimation, model execution and model optimization for fuel cell systems, clusters of fuel cell systems for one site, or clusters of fuel cell systems across multiple sites. The site based optimization achieved by the power generation system leads to more efficient operation for energy customers and higher profit for energy suppliers.

The foregoing description of a preferred embodiment of the invention has been presented for purposes of illustration and description. It is not intended to be exhaustive or to limit the invention to the precise form disclosed, and modifications and variations are possible in light of the above teaching or may be acquired from practice of the invention. The embodiment was chosen and described in order to explain the principles of the invention and as a practical application to enable one skilled in the art to utilize the invention in various embodiments and with various modification are suited to the particular use contemplated. It is intended that the scope of the invention be defined by the claims appended hereto and their equivalents.

What is claimed is:

1. A power generation system, comprising:
   a fuel cell controller;
   at least one fuel cell cluster operably connected to the fuel cell controller;
   a data server operably connected to the fuel cell cluster, wherein the data server is configured to obtain operational data from the fuel cell cluster; and
   a model server operably connected to the data server, configured to model operational characteristics of the fuel cell cluster during the actual operation of the fuel cell cluster and modify the operation of the fuel cell cluster in real-time, based on the operational data obtained by the data server.

2. The power generation system as claimed in claim 1, further comprising an operator advisory station operably connected to the model server and the fuel cell controller and configured to allow a human operator to modify the operation of the fuel cell cluster based on recommendations received from the model server.

3. The power generation system as claimed in claim 1, wherein the fuel cell cluster comprises:
   a plurality of fuel cell modules, each containing a plurality of fuel cell stacks;
   a fuel processing module adapted in operation to deliver fuel to the plurality of fuel cell modules; and
   an electronics module adapted in operation to receive power from the fuel cell modules and modify the received power into a usable form.

4. The power generation system as claimed in claim 3, wherein the fuel cell controller is configured to control the operation of each individual fuel cell module in the fuel cell cluster.

5. The power generation system as claimed in claim 1, wherein the fuel cell cluster is operably connected to the data server via a gateway.

6. The power generation system as claimed in claim 5, wherein the gateway is co-located with the fuel cell cluster.

7. The power generation system as claimed in claim 1, wherein the data server is configured to send operational instructions to the fuel cell cluster based on the model server's analysis of the received operational data.

8. The power generation system as claimed in claim 7, wherein the operational instructions are set points configured to govern the operation of the fuel cell cluster.

9. The power generation system as claimed in claim 1, wherein the data server is configured to reconcile the received operational data with known instrument models and reliability data to obtain a consistent set of operational data values for the fuel cell cluster.

10. The power generation system as claimed in claim 1, wherein the model server is configured to receive the operational data from the data server and determine the optimum economic and operational efficiency of the power generation system based on the operational data.

11. A method for optimizing the operation of a power generation system having at least one fuel cell cluster containing a plurality of fuel cell modules, comprising:
    obtaining operational data from the fuel cell cluster during operation of the fuel cell cluster;
    modeling the operation of the fuel cell cluster in real-time using the operational data obtained from the fuel cell cluster;
    determining whether the operation of the fuel cell cluster can be improved by calculating the optimum operational set points for the fuel cell cluster based on the obtained operational data; and
    modifying the operation of the fuel cell cluster by setting the fuel cell cluster to operate at the optimum operational set points.

12. The method for optimizing the operation of a power generation system as claimed in claim 11, further comprising reporting the optimum operational set points for the fuel cell cluster to a user.

13. The method for optimizing the operation of a power generation system as claimed in claim 11, wherein the optimum operational set points are directed to operate the power generation system at optimum efficiency.

14. The method for optimizing the operation of a power generation system as claimed in claim 11, wherein the optimum operational set points are directed to operate the power generation system with optimum operating costs.

15. The method for optimizing the operation of a power generation system as claimed in claim 11, wherein the fuel cell cluster comprises:
    the plurality of fuel cell modules, each containing a plurality of fuel cell stacks;
    a fuel processing module adapted in operation to deliver fuel to the plurality of fuel cell modules; and
    an electronics module adapted in operation to receive power from the fuel cell modules and modify the received power into a usable form.

16. The method for optimizing the operation of a power generation system as claimed in claim 15, further comprising controlling the operation of each individual fuel cell module in the fuel cell cluster.

17. The method for optimizing the operation of a power generation system as claimed in claim 15, wherein the step of modifying further comprises changing at least one of fuel flow rate, a parameter which influences temperature, or power output of the fuel cell module.

18. The method for optimizing the operation of a power generation system as claimed in claim 17, wherein the step of modifying comprises operating a plurality of fuel cell modules at a different fuel flow rates, temperature, and/or power output.

19. The method for optimizing the operation of a power generation system as claimed in claim 11, wherein the fuel cell cluster is operably connected to a data server via a gateway.

20. The method for optimizing the operation of a power generation system as claimed in claim 19, wherein the gateway is co-located with the fuel cell cluster.

21. The method for optimizing the operation of a power generation system as claimed in claim 11, wherein operational instructions are sent to the fuel cell cluster based on an analysis of the received operational data.

22. The method for optimizing the operation of a power generation system as claimed in claim 21, wherein the operational instructions are set points configured to govern the operation of the fuel cell cluster.

23. The method for optimizing the operation of a power generation system as claimed in claim 11, wherein the received operational data is reconciled with known instrument models and reliability data to obtain a consistent set of operational data values for the fuel cell cluster.

24. The method for optimizing the operation of a power generation system as claimed in claim 11, wherein optimum economic and operational efficiency of the power generation system is determined based on the operational data.

25. The method for optimizing the operation of a power generation system as claimed in claim 11, wherein the step of modifying the operation of the fuel cell cluster comprises modifying at least one continuous or discrete variable.

26. A power generation system, comprising:
a plurality of fuel cell clusters, each cluster comprising:
at least one fuel cell module, each fuel cell module comprising a plurality of fuel cell stacks;
a fuel processing module adapted in operation to deliver fuel to the fuel cell module; and
an electronics module adapted in operation to receive power from the fuel cell modules and modify the received power into a usable form;
a fuel cell economic controller; and
a fuel cell supervisory controller; and
at least one server operably connected to the fuel cell economic controller of each cluster and configured to receive operational data from each fuel cell cluster, wherein the at least one server is adapted to determine an optimum economic and operational efficiency of the power generation system and to modify operation of the plurality of fuel cell clusters to achieve the optimum economic and operational efficiency of the power generation system based on the received operational data.

\* \* \* \* \*